United States Patent [19]

Jarish

[11] 4,038,363
[45] July 26, 1977

[54] UPGRADING SORELSLAG FOR PRODUCTION OF SYNTHETIC RUTILE

[75] Inventor: Basil Jarish, St. Lambert, Canada

[73] Assignee: Quebec Iron & Titanium Corporation-Fer et Titane due Quebec, Inc., Sorel, Canada

[21] Appl. No.: 624,458

[22] Filed: Oct. 21, 1975

[51] Int. Cl.$^2$ .............................................. C01G 23/04
[52] U.S. Cl. ........................................ 423/82; 423/53; 423/68; 423/86; 423/610
[58] Field of Search ................. 75/24; 423/82, 86, 84, 423/150, 610, 53, 68

[56] References Cited

U.S. PATENT DOCUMENTS

| | | | |
|---|---|---|---|
| 2,109,917 | 3/1938 | Dunn | 423/82 |
| 3,269,831 | 8/1966 | Wilson | 75/24 |
| 3,368,870 | 2/1968 | Soluducha | 423/86 |
| 3,753,681 | 8/1973 | Vojkovic | 75/24 |

Primary Examiner—O. R. Vertiz
Assistant Examiner—Brian E. Hearn

[57] ABSTRACT

Upgrading of titanium values in a slag such as Sorelslag by working up the slag such as by alkali salt roasting to render the slag leachable in a plurality of leaching stages to recover titania (and other) values of 94 to 97 percent purity useful in a sulphate or a chloride process for producing titanium dioxide.

6 Claims, 1 Drawing Figure

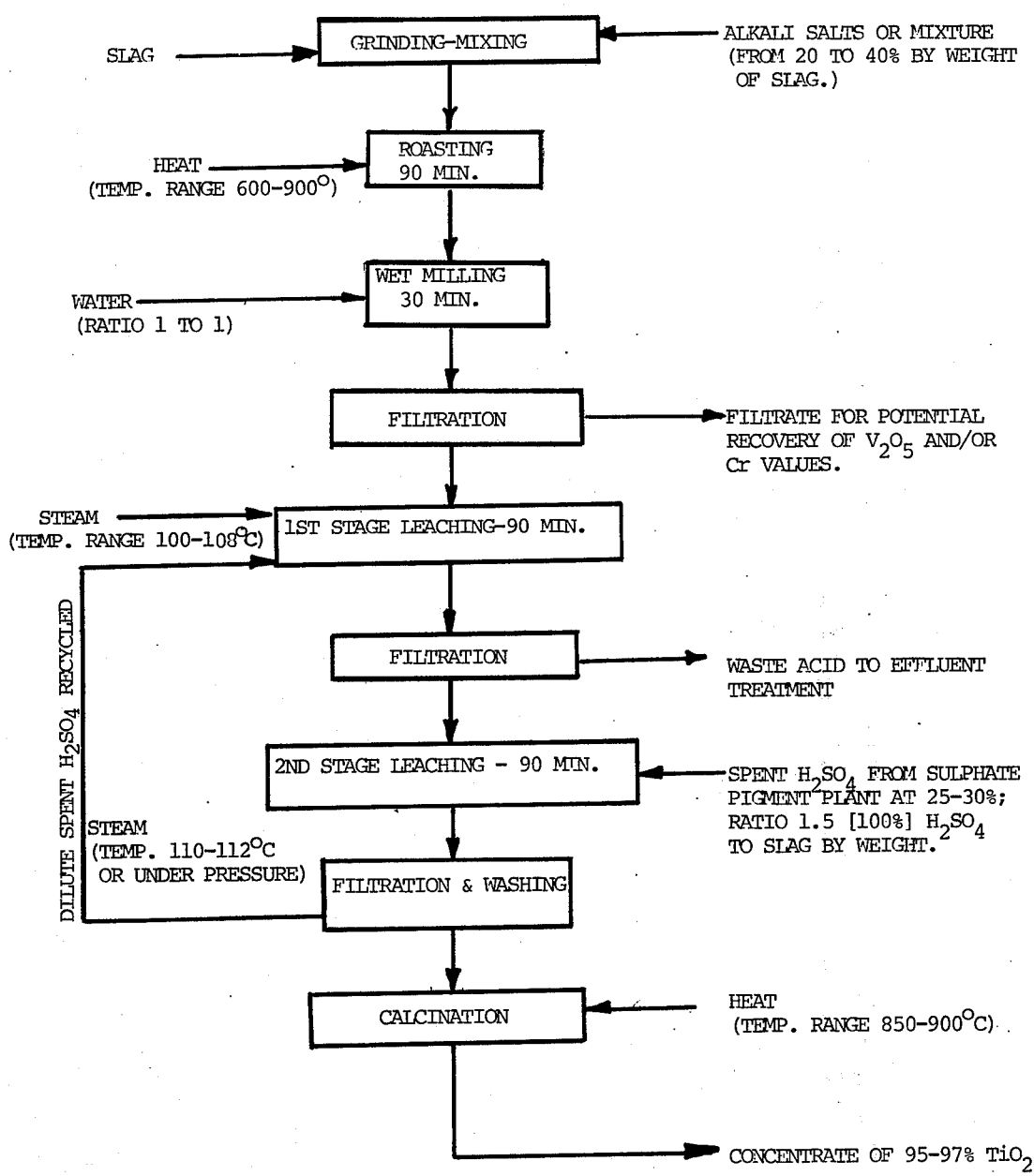

UPGRADING SORELSLAG FOR PRODUCTION OF SYNTHETIC RUTILE

This invention relates to recovery of titanium values from a slag obtained when iron values are removed from ilmenite by electrosmelting and a titanium rich slag is worked up; more particularly, this invention pertains to recovery of titanium values whereby the slag is worked up to render it leachable and thus the undesired impurities are removed. Accordingly, a process has been disclosed which provides, in an integrated manner for the recovery of titanium values from Sorelslag, recovery of impurities (which have a value in their own right) and utilization of waste by-product acids in the recovery process to further integrate a complete utilization of a mineral resource such as ilmenite.

BRIEF DESCRIPTION OF PRIOR ART

Various methods are known for producing synthetic rutile which is a high concentrate of $TiO_2$. Natural rutile which is a very pure source of $TiO_2$, however, is a rather scarce mineral. Other sources of titanium containing materials are available but each is of complex chemistry and requires elaborate separation of the various impurities before the upgraded mineral material may be subjected to the chlorination or sulphate process for the ultimate obtention of pigmentary $TiO_2$. As a result, a series of different steps are developed, often, for a single source of titanium containing minerals for the separation of impurities. An appropriate illustration of the various method within the prior art is found in U.S. Pat. No. 3,647,414 in the patents cited in that reference.

However, the general work-up of mineral ore sources are significantly and markedly different from the work-up of slags which contain large amounts of titanium values and from which the primary metal value has been removed, such as iron e.g. by electrosmelting. Thus, a rather unique source of titanium values is Sorelslag obtained after substantial amounts of iron have been removed from ilmenite. In distinction from ores or mineral sources containing titanium, Sorelslag may not be worked up in the same manner as ores or mineral sources of titanium. Hence, it has required that titanium values in Sorelslag have to be separated from impurities by various processes before these values can be subjected to a chlorination reaction.

Although various ore separation and work-up procedures have been illustrated, such as in U.S. Pat. Nos. 3,457,037 and 3,529,933 and British Pat. No. 696,501, the disclosed processes do not work on Sorelslag because it is not amenable to conventional leaching reactions to which the titanium containing ores are subjected. Other disclosed purification steps of substantially pure titanium dioxide preparation are not applicable because the purification steps of the Sorelslag are vastly larger in magnitude and require the separation of large amounts of impurities other than iron. Illustrative prior art impurity separation steps are found in Canadian Pat. No. 807,589 and British Pat. No. 309,598.

Although the impurities are undesirable when producing titanium dioxide pigments, the impurities are of economic significance if recovered and can aid in the overall economic utilization of Sorelslag as a source of titanium.

BRIEF DESCRIPTION OF THE INVENTION

It has been discovered that roasting of an intimate mixture of ground slag, such as Sorelslag, with a relatively small amount of powdered alkali salts, be these salts of sodium, potassium, or other alkali metals, (such as lithium, rubidium or cesium if available), or a mixture of these salts, i.e. carbonates, chlorides, sulphates, nitrates, or their oxides or hydroxides, at a temperature ranging from about 600° to 950° C for one to about four hours, results in the refractory structure of the slag being destroyed and new alkali compounds being formed. Preconditioning of the slag thus allows the further work-up of the slag and renders it amenable to leaching, such as acids which heretofore were not feasible from chemical as well as an economical point of view.

Some of the newly formed alkali compounds are readily soluble in water (alkali chromate, vanadate, aluminate); the others including calcium, magnesium, silica, iron, etc. are soluble in mineral acids preferentially at boiling temperature. Thus, the discovered interacting work-up procedure places the Sorelslag in a position of better, heretofore, unavailable utilization of titanium values.

The insoluble slag residue constitutes a high concentrate of $TiO_2$ which can be used either as a high quality feed for pigment production by the sulphate process (economy in acid consumption, high quality pigments, less effluent to dispose, etc.) or can be processed to synthetic rutile suitable for chloride pigment process.

Before acid leaching, the roasted slag should be briefly milled to disintegrate lumps that are formed by roasting. During wet milling which is more efficient than dry dispersion, alkali chromate and vanadate dissolve in water and simplifies separation and recovery of $V_2O_5$ and $Cr_2O_3$ if desired.

Thus, an effective process for upgrading standard Sorelslag to a high quality titania concentrate has now been found whereby selective extraction of iron and other impurities including silica from ground slag, which when roasted with alkali and when subjected to acid leaching provides a titania concentrate especially suitable for obtaining high grade pigmentary $TiO_2$.

Further, a process has been discovered for selective extraction of iron and other impurities including silica from alkali roasted slag by employing a hydrolysis waste acid as free of charge extractant which, otherwise, must be disposed of, at additional cost.

Moreover, the discovered process provides for upgrading standard Sorelslag to a high concentrate of $TiO_2$ by subjecting an intimate mixture of slag (ground preferably to a size passing standard U.S. screen of 200 mesh) and an alkali salt of particular choice, or with a mixture of slag with two or more different alkali salts or their oxides to roasting at selected temperature and time, followed by selective extraction of chromium and vanadium in water solution while the roasted material is being disintegrated. Further, the selective extraction of iron and other impurities including silica, with dilute hydrolysis waste acid by boiling at atmospheric pressure in a single or preferably in a two or three stage leaching operation, provides an eminently desirable process for the extraction of undesirable metal values from Sorelslag.

Accordingly, still another optional aspect of the invention is to provide a method for potential recovery of $Cr_2O_3$ and $V_2O_5$ as highly pure by-products from a water solution which solution is recovered prior to leaching of the roasted ore by a method e.g. ion exchange technique, thus improving the overall economics of the process.

Thus, a method has been provided for an effective concentration of chromium and vanadium values from their dilute solutions for further separations and recovery by known techniques.

DETAILED DESCRIPTION OF THE INVENTION AND EMBODIMENTS THEREOF

Average composition of standard Sorelslag is given in Table I below.

TABLE I

| Average Composition of Sorelslag | | | |
|---|---|---|---|
| $TiO_2$ (corrected) | 70.3% | CaO | 1.0% |
| $Ti_2O_3$ as $TiO_2$ | 9.7% | MgO | 5.1% |
| Fe (total) | 9.5% | MnO | .24% |
| Fe (metallic) | .54% | $Cr_2O_3$ | .18% |
| FeO | 11.6% | $V_2O_5$ | .58% |
| $Al_2O_3$ | 6.0% | $SiO_2$ | 5.7% |

Grinding, mixing, and roasting of slag including a dispersion of agglomerates after roasting by milling and all other operations of the process may be carried out by using conventional equipment suitable for the purpose in either a continuous or in batch type operation.

Leaching with acid has to be carried out in vessels equipped with acid resistant linkings, such as lead, suitable plastic, or acid resistant brick lining. Sulphuric acid and particularly, spent sulphuric acid which is a waste hydrolysis acid from the sulphate process $TiO_2$ pigment plant from an economic viewpoint, is the preferred acid for leaching. It is a rather effective leaching agent for iron and other impurities contained in the slag if the roasting conditions of the slag-alkali salt mixtures are carried out correctly.

The leaching should be carried out preferably in two stages. The first stage leaching for which a weak acid from the second stage is employed as shown in the flow diagram in the Figure herein, should be carried out preferably under reflux conditions. This leaching arrangement is necessary to prevent concentration of acid by evaporation, i.e., 1 ) to prevent an imminent hydrolysis of gelatinous and insoluble and no more separable precipitate of silica which takes place almost instantly when the acid concentration increases to about 16 to 17% $H_2SO_4$ and 2) to avoid possible losses of $TiO_2$ by dissolution in the acid. Hence, the acid concentration for the first stage should be less than about 15%. The acid for the second (final) stage leaching should be stronger in order to achieve a better extraction efficiency. A hydrolysis waste acid contains usually between 25 to 28% of free $H_2SO_4$. A typical analysis of such waste acid is given below.

TABLE II

| Composition of Hydrolysis Waste Acid | |
|---|---|
| $TiO_2$ | 6.0 g. p. l. (grams per liter) |
| $Cr_2O_3$ | .4 g. p. l. |
| $V_2O_5$ | 1.2 g. p. l. |
| Fe | 25.0 g. p. l. |
| $H_2SO_4$ | 294.0 g. p. l. |

Since a higher concentration of acid during the second stage leaching improves the extraction efficiency of impurities, it is advantageous to carry out second stage leaching without reflux condenser. Due to some water being evaporated, the $H_2SO_4$ concentration increases and the extraction efficiency of impurities will improve also. The acid will be recycled into the first stage as weaker and more dilute acid where dissolved $TiO_2$ will reprecipitate back during the leaching cycle.

The second or final leaching of preconditioned slag may be as well carried out at elevated temperature under pressure. The extraction efficiency of impurities will certainly improve and the leaching cycle could be considerably reduced, however, leaching at higher temperature under pressure will require more expensive equipment.

The invention will be further illustrated by typical examples disclosing the roasting procedures and the upgrading efficiency of the process all to be considered with reference to the Figure herein illustrating the flow diagram.

According to the process, Sorelslag was ground to about 98% passing 325 mesh standard sieve and intimately mixed with a selected member of alkali metal group, or with a mixture of carbonates, chlorides, nitrates, sulphates or hydroxides of alkalies at various weight ratios placed in the furnace at preselected temperature and roasted in air for a predetermined length of time. Of the selected members of alkali group, the following are within the scope of the process: sodium and potassium carbonates and chlorides, nitrates, hydroxides or their mixtures.

The weight ratios of alkali or the enumerated salts or derivatives thereof are from 0.3:1 to 0.6:1 based on a unit of weight of Sorelslag. Preselected temperatures, depending on the composition of alkali salt mixtures, range from 600° to 950° C while the predetermined length of time ranges from 1 to 4 hours. The eutectic mixtures of alkali salts can also be used effectively for slag roasting. Their melting point is substantially lower than that of the individual components. Therefore, the roasting temperature of slag with eutectic mixtures of alkali salts can be carried out at substantially lower temperatures. An eutectic mixture of $NaCl+Na_2CO_3$ which is a 60% and 40% mixture by molar weight ratio of NaCl and $Na_2CO_3$ respectively, melts at 640° C comparing to 801° C for NaCl and 851° C for $Na_2CO_3$ and an eutectic mixture of $KCl + Na_2CO_3$ which is a mixture of 40% KCl and 60% $Na_2CO_3$ by molar weight ratio respectively, melts at 58° C, compared to 776° C for KCl and 851° C for $Na_2CO_3$. Therefore, the roasting temperature of slag with these mixtures can be carried out slightly above the melting point of these mixtures.

Aqueous alkali hydroxides, as such, are ineffective in destroying the refractory slag structure, however, they become effective when all water is evaporated and the temperature of the charge exceeds the melting point of dry hydroxide which for NaOH is 318° C and for KOH, 360° C.

EXAMPLE 1

A mixture of 140 parts of slag, 50 parts of soda ash, and 10 parts of NaCl was roasted for 2 hours at 900°-925° C. Dispersion of agglomerates was carried out by wet milling for about 30 minutes. The water washed residue was leached by a two-stage, counter-current leaching technique in which the first stage constituted boiling for 90 minutes with spent $H_2SO_4$ containing 157.7 g/l or 14% $H_2SO_4$, while the second stage constituted boiling for 120 minutes with spent $H_2SO_4$ containing 294 g/l or 25% $H_2SO_4$. The filtered and washed residue was calcined at 900°C for 30 minutes.

EXAMPLE 2

A mixture of 140 parts of slag and 60 parts of soda ash was roasted for 3 hours at 850°-900° C. The dispersed, water washed product was leached in two stages in which the first stage leaching for 90 minutes constituted boiling in waste acid containing 98 g/1 or 9% $H_2SO_4$, while the second stage leaching for 120 minutes constituted boiling in waste acid containing 294 g/1 or 25% $H_2SO_4$. Filtration, washing, and calcination was carried out by following the steps as outlined in Example 1.

EXAMPLE 3

A mixture of 136 parts of slag, 54 parts of soda ash, and 10 parts of NaCl was roasted for 2 hours at 900°-925° C. The dispersed and water washed product was leached in two stages:
First stage — 90 minutes boiling with 14% spent $H_2SO_4$ (153.0 g/1)
Second Stage — 2 hours boiling with fresh 27% $H_2SO_4$ (322 g/1).
Filtration, washing, and calcination as in Example 1.

EXAMPLE 4

A mixture of 130 parts of slag, 54 parts of soda ash, 10 parts of NaCl, and 6 parts of NaOH was roasted for 2.5 hours at 800°-900° C.

The water washed residue was repulped in hot (85° C) waste $H_2SO_4$ containing 75 g/1 or 7% $H_2SO_4$ and stirred for 25 minutes and filtered. Thereafter leaching was as follows:
First stage — 120 minutes boiling in spent acid containing 167.0 g/1 or 16% free $H_2SO_4$.
Second stage — 150 minutes boiling in spent acid containing 294.0 g/1 or 25% $H_2SO_4$.
Filtration, washing, and calcination as in Example 1.

EXAMPLE 5

A mixture of 126 parts of slag, 54 parts of soda ash, and 20 parts of eutectic mixture containing 69.5% by weight of $Na_2SO_4$ and 30.5% by weight of NaCl was roasted for 90 minutes at 800° to 925° C. The dispersed water washed product was leached in three stages as follows:
First stage — 30 minutes boiling in acid containing 76 g/1 $H_2SO_4$ (7%).
Second stage — 90 minutes boiling in acid containing 133 g/1 $H_2SO_4$ (12%).
Third stage — 120 minutes boiling in acid containing 235 g/1 $H_2SO_4$ (21%).
The acid in all stages was waste acid.
Filtration, washing, and calcination as in Example 1.

EXAMPLE 6

A mixture of 136 parts of slag, 54 parts of soda ash, and 10 parts of KCl (sylvite) was roasted at 900°-925° C for 2 hours. The dispersed water washed product was leached in two stages:
First stage — 75 minutes boiling in 10% spent $H_2SO_4$ (103.0 g/1).
Second stage — 120 minutes boiling in 25% spent $H_2SO_4$ (294.0 g/1)
The residue was treated as in Example 1.

EXAMPLE 7

A mixture of 140 parts of slag, 58 parts of soda ash, and 2 parts of $K_2CO_3$ was roasted for 90 minutes at 900°-925° C in atmosphere of nitrogen. The dispersed water washed residue was leached in two stages:
First stage — 90 minutes stirring in waste 14% $H_2SO_4$ at 85° C.
Second stage — 3 hours boiling in 32% $H_2SO_4$ (394 g/1 $H_2SO_4$) (waste acid concentrated by evaporation).
The residue was treated as in Example 1.

EXAMPLE 8

A mixture of 136 parts of slag, 54 parts of $K_2CO_3$, and 10 parts of KCl (sylvite) was roasted for 90 minutes in nitrogen at 925° C. The dispersed water washed residue was leached as follows:
First stage — 90 minutes stirring in a waste 13% $H_2SO_4$ at 85° C.
Second stage — 150 minutes boiling in 32% $H_2SO_4$ (394 g/1 $H_2SO_4$) (concentrated as in Example 7).
The residue was processed as in Example 1.

EXAMPLE 9

A mixture of 130 parts of slag, and 70 parts of soda ash was roasted for 2 hours at 925° C under the flow of $CO_2$ gas. The wet milled residue was leached in two stages as follows:
First stage — 90 minutes boiling with recycled $H_2SO_4$ containing 158.2 g/1 or 14.5% free $H_2SO_4$.
Second stage — 120 minutes boiling with 32% acid containing 394.0 g/1 free $H_2SO_4$, as in Example 7.
The residue was processed as in Example 1.

EXAMPLE 10

A mixture of 123 parts of ground slag and 77 parts of an eutectic mixture of NaCl and $Na_2CO_3$ containing 60% by molar weight of NaCl and 40% by molar weight of $Na_2CO_3$, was roasted for 3 hours at 700°-725° C.

The dispersed and water leached residue was leached in two stages as follows:
First stage — 80 min. boiling in waste 12.5% $H_2SO_4$ at atmospheric pressure under reflux.
Second stage — 120 min. boiling in waste 25% $H_2SO_4$.
The residue was processed as in Example 1

TABLE III
Summary of Upgrading Results
Composition of Final Product in Percent

| Example No. | $TiO_2$ | Fe | $Al_2O_3$ | CaO | MgO | $Na_2O$ | $K_2O$ | $Cr_2O_3$ | $V_2O_5$ | $SiO_2$ |
|---|---|---|---|---|---|---|---|---|---|---|
| 1 | 96.2 | 1.65 | .47 | .26 | .43 | .20 | — | .02 | .03 | .40 |
| 2 | 95.6 | 1.80 | .30 | .33 | .24 | .28 | — | .02 | .02 | .33 |
| 3 | 98.1 | 1.07 | .24 | .25 | .14 | .22 | — | .01 | .01 | .20 |
| 4 | 97.2 | .86 | .19 | .27 | .19 | .24 | — | .01 | .01 | .66 |
| 5 | 95.3 | 1.74 | .22 | .34 | .11 | .31 | — | .03 | .01 | .27 |
| 6 | 96.6 | 1.90 | .29 | .34 | .25 | .21 | — | .02 | .03 | .45 |
| 7 | 98.4 | .80 | .14 | .22 | .09 | .18 | — | .01 | .01 | .21 |
| 8 | 98.7 | .60 | .13 | .33 | .22 | — | .10 | .01 | Nil | .30 |
| 9 | 97.0 | 1.20 | .14 | .39 | .15 | .19 | — | .01 | .01 | .42 |
| 10 | 95.6 | 2.30 | .49 | .26 | .19 | .27 | — | .07 | .12 | trace |

The results shown in Table III clearly demonstrate the superior performance of the present invention in the field of the upgrading Sorelslag, and rendering it suitable for production of high quality synthetic rutile.

Thus, the invention provides a process for an effective upgrading of Sorelslag which otherwise is difficult to upgrade by acid leaching alone even at elevated temperatures and under pressure as high as 300 to 400 psi. Such prior art processes are expensive, extremely hard on equipment and remove only iron and a part of other impurities. The highest possible $TiO_2$ content in the final product amounts to about 90-91% $TiO_2$ because the elements of the silicate phase remain indestructible by any acid except HF.

From the environmental viewpoint, the invention offers an attractive solution to the waste disposal problem. The invention may be of a particular interest to those of $TiO_2$ pigment producers who use both routes for pigment production, i.e., sulphate and chloride route pigments. These producers could produce their own synthetic rutile to feed the chloride process, using their own hydrolysis waste acid from the sulphate plant to upgrade a slag to synthetic rutile. The upgraded product free of undesired impurities (Cr, V, etc.) is also useful for the sulphate process. Consequently, substantially reduced sulphuric acid consumption while pigment quality is improved is now available as a viable alternative to the prior art processes.

Generally, the upgraded product as shown in Table III is a substantially fine product, too fine for direct chloride feed, but it can be readily transformed into a high quality synthetic rutile, possessing all desirable characteristics for chloride feed.

As for waste acid disposal, the overall cost of disposal could be divided between the two production lines, i.e., sulphate pigment manufacturing and production of synthetic rutile, because both lines would be using the same acid and sharing the same disposal cost.

While the invention has been disclosed by reference to the details of the preferred embodiment thereof, it is to be understood that the disclosure is illustrative and is not to be taken as limitative of the invention which is intended to include any equivalent procedures within the scope of the appended claims.

What is claimed is:

1. A process for recovering titanium, as $TiO_2$, and other values from Sorelslag the steps comprising:
   a. admixing Sorelslag with an alkali metal salt or mixtures thereof in a weight ratio of 0.3:1 to 0.6:1 salt to slag and roasting the same at a temperature from 600° to 950° C for about 1 to 4 hours;
   b. leaching in a first leaching stage said roasted slag, said leaching liquor being introduced from a subsequent leaching stage and being at a concentration of less than about 15% $H_2SO_4$;
   c. leaching in at least one additional stage said slag, with a leaching liquor which is sulphuric acid of 25% to 30% concentration and returning the spent leaching liquor to a preceeding stage for first stage leaching; and
   d. calcining in a temperature range of 850 to 950° C said leached slag to obtain a $TiO_2$ concentrate having at least 94% $TiO_2$ present.

2. The process as defined in claim 1, wherein the slag is ground and is admixed with salts of sodium or potassium or a mixture of said salts in an amount from 20 to 40% by weight based on said slag.

3. The process as defined in claim 1, wherein said slag is roasted with said salts whereby the refractory structure of said slag is destroyed, said roasting being at a temperature from 850° C to 900° C.

4. A process for recovering titanium, as $TiO_2$, and other values from Sorelslag the steps comprising:
   a. admixing Sorelslag with an alkali metal salt or mixtures thereof in a weight ratio of 0.3:1 to 0.6:1 salt to slag and roasting the same at a temperature from 600° to 950° C for 1 to 4 hours;
   b. wet milling said slag and filtering the same including removing from filtrate vanadium and chromium values;
   c. leaching countercurrently in a first stage said slag with sulfuric acid leaching liquor, said leaching liquor being introduced from a subsequent leaching stage said leaching liquor being at a concentration of less than about 15% $H_2SO_4$;
   d. separating the spent leaching liquor from said first stage leached slag;
   e. leaching in at least one additional stage said slag with a leaching liquor which is a sulphuric acid leaching liquor wherein the concentration of sulphuric acid in said leaching liquor is about 25 to 30%;
   f. filtering said leached slag and returning the spent leaching liquor to a preceeding stage for leaching of said slag in said first stage; and
   g. calcining said leached slag to obtain a $TiO_2$ concentrate having at least 94% $TiO_2$ present.

5. The process for recovery of titanium values from Sorelslag as defined in claim 11, wherein in step (a) a refractory structure of said slag is destroyed by admixing and roasting said slag with an alkali metal salt or mixtures thereof including carbonates, chlorides, sulphates, nitrates, or oxides or hydroxides whereby said slag is rendered amenable to leaching.

6. The process as defined in claim 4 wherein said leaching is carried out in the first stage at an atmospheric boiling temperature, under reflux, utilizing spent acid from a subsequent leaching stage, said acid being diluted with washings to contain a maximum concentration of less than about 15% of $H_2SO_4$, and leaching in the second stage, for which a spent acid of a concentration from 25 to 30% of $H_2SO_4$ is employed to obtain a leached slag, said leaching being carried out at atmospheric boiling temperature and atmospheric pressure, and recovering the final concentrate of $TiO_2$ by filtering of said leached slag, washing said leached slag, and calcining said leached slag at a temperature of 850° to 900° C.

* * * * *